March 1, 1949.　　　　G. P. DAIGER　　　　2,463,359
REFRIGERATION
Filed Oct. 29, 1943　　　　　　　　　　　　　2 Sheets-Sheet 1
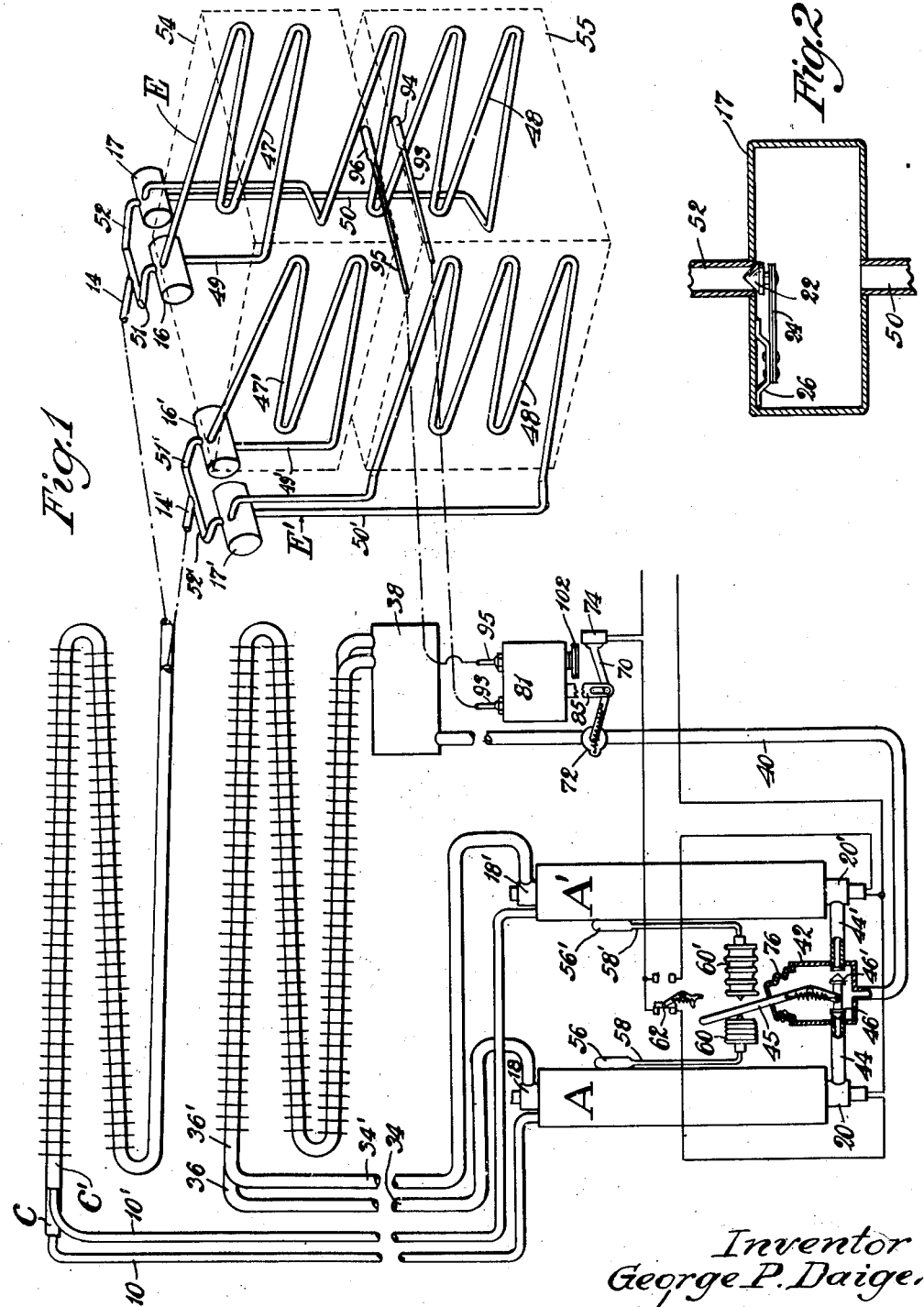
Inventor
George P. Daiger
by Harry S. Dunarr
Attorney.

March 1, 1949.  G. P. DAIGER  2,463,359
REFRIGERATION
Filed Oct. 29, 1943  2 Sheets-Sheet 2
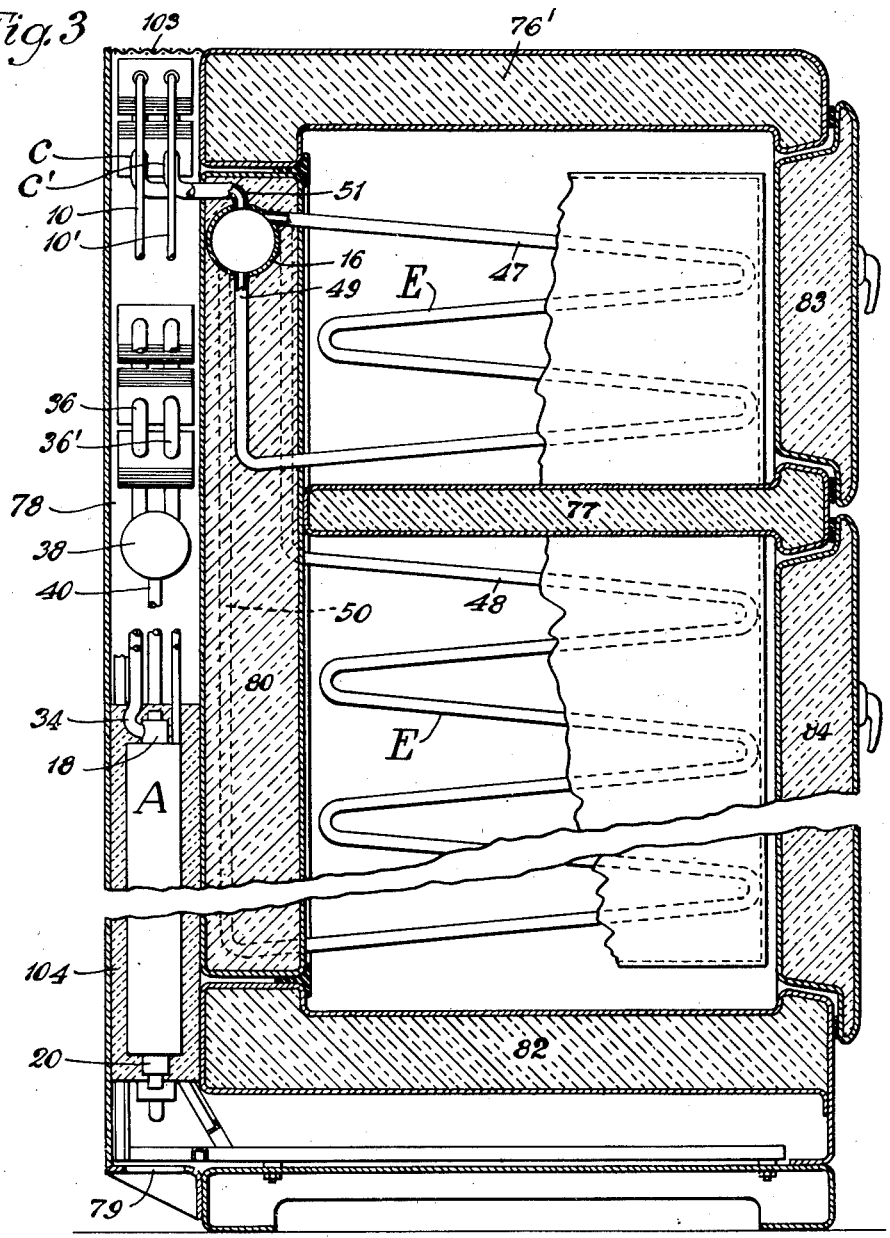
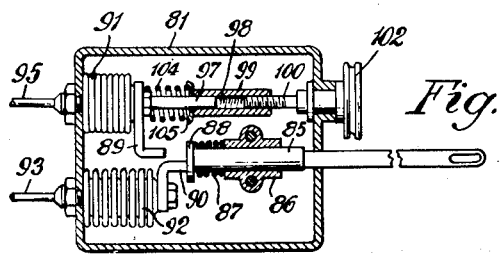
Inventor
George P. Daiger
by Harry S. Dumarse
Attorney.

Patented Mar. 1, 1949

2,463,359

UNITED STATES PATENT OFFICE 2,463,359

REFRIGERATION

George P. Daiger, Canton, Ohio, assignor to The Hoover Company, North Canton, Ohio, a corporation of Ohio Application October 29, 1943, Serial No. 508,134

18 Claims. (Cl. 62—5)

This invention relates to refrigeration and more particularly to a means and method for maintaining a temperature differential in two refrigerating zones.

In modern domestic refrigerating apparatus in which the same evaporator is used for freezing purposes, for maintaining food in frozen condition and also for maintaining the food storage compartment refrigerated, the air in the food storage compartment is dehydrated by deposition of moisture from the air on the cold evaporator in the form of frost with the result that this dehydrated air picks up moisture from the foods in the food storage compartment and dehydrates the same.

It is accordingly an object of this invention to provide a means and method by which a portion of the evaporator of the refrigerating apparatus can be maintained at a temperature sufficiently low for freezing purposes or for maintaining comestibles in frozen condition and another portion maintained at a mean temperature slightly above freezing so that the air and accordingly the food in the food storage compartment will not be dehydrated and will be maintained at proper temperature and humidity.

More particularly, according to this invention, a dual intermittent absorption machine is provided comprising two intermittent units operating alternately on the absorption and generating periods to produce substantially continuous refrigeration in which the evaporator of each unit is provided with two coils, one for the high temperature chamber and the other for the low temperature chamber. The coils for the high temperature chamber are connected to receiver vessels in such a manner that they are cut off from the generator-absorber then operating on the absorption period when a predetermined low temperature is reached in the high temperature coils so that evaporation of liquid refrigerant in the high temperature coils takes place only when there is a demand for refrigeration therein.

Conduits for leading liquid refrigerant to both the low and high temperature compartments are connected to receiver vessels so arranged that a local circulation of refrigerant is produced through each conduit by the evaporating refrigerant. When the temperature of the high temperature compartment reaches a predetermined proper low level, the evaporation of refrigerant is throttled or cut off completely so that no further evaporation of refrigerant takes place in the conduits of the high temperature compartment.

During the first portion of the above-stated operation, evaporation of refrigerant in both zones takes place at a comparatively high vapor pressure and the rate of circulation and evaporation of the refrigerant in each zone is directly proportional to the load on the respective zone, while during the second portion of operation, evaporation of refrigerant takes place only in the low temperature zone and at a comparatively low vapor pressure.

This is a distinct savings since it is not necessary to pump heat at a low heat level from the high temperature compartment to the cooling air as has been the case in the past but when the heat level in the high temperature compartment has reached its proper level, the transfer of heat from that zone to the cooling air ceases.

The above arrangement also has the advantage that the transfer of heat from both the high and low temperature compartments will take place in proportion to the load on the respective compartments regardless of whether the heaviest load is placed on the low or high temperature compartment.

In intermittent absorption refrigerating apparatus operating alternately on the absorption-evaporation and generation-condensation periods of operation, it is difficult to maintain two portions of the evaporator at different temperatures because the temperature of the generator-absorber, and as a result the vapor pressure of the refrigerant therein, determines the temperature at which the evaporator operates. This starts at a maximum when the generator-absorber first begins the absorption period of operation and reaches a minimum just prior to the time the generator-absorber is switched to the generating period, with the result that the evaporator is periodically operated at high vapor pressures and high temperatures with a gradually lowering vapor pressure or temperature until the minimum is reached. If a portion of the evaporator is operated so as to freeze ice or maintain comestibles in a frozen condition, the portion of the evaporator which is utilized to cool the food storage compartment reaches too low a temperature during the latter part of the evaporation period and dehydrates the air in the food storage compartment.

According to the present invention, the portion of the evaporator utilized to cool the food storage compartment is shut off from direct communication with the generator-absorber during the latter portion of the evaporation period of operation while the part utilized for freezing purposes or maintaining foods in frozen condition is maintained in open communication with the generator-absorber at all times.

Other objects and advantages of the invention will become apparent as the description proceeds when taken in connection with the accompanying drawings, in which:

Figure 1 is a diagrammatic view of a dual intermittent absorption refrigerating machine according to this invention;

Figure 2 is a sectional view showing details of the valve for cutting off communications between the high temperature evaporator and the generator-absorber during the latter part of the absorption phase;

Figure 3 is a view showing the system of Figure 1 properly arranged for assembly with a domestic refrigerator cabinet; and Figure 4 shows the details of the control device.

Referring to Figure 1 of the drawings, A, A' represents two generator-absorbers, C, C' two primary condensers, and E, E' two evaporators. The absorbent-receiving chambers of the generator-absorbers A, A' are connected to condensers C, C' by conduits 10 and 10'. The condensers C, C' have a downwardly inclined slope throughout and are connected by conduits 14, 14' to receiving vessels 16, 16' and 17, 17' which form a part of the evaporators E, E'. The construction and operation of the evaporators E, E' will be discussed in more detail hereinafter.

Each generator-absorber A, A' has an absorbent-receiving chamber formed by the outer cylindrical walls of the vessels A, A', the outer cylindrical walls of the heat exchange vessels 18, 18' and end closures (not shown) welded to the cylindrical walls. The annular chambers so formed are provided with suitable trays (not shown) having openings through the walls thereof and being welded to the inner and outer cylindrical walls of the annular chamber. These trays support any well known solid absorbent such as strontium chloride which will absorb the refrigerant vapor such as ammonia, which solid absorbent may be charged into the absorbent-receiving chamber in any manner well known to the art.

The heat exchange vessels 18, 18' are formed of inner and outer concentric cylindrical walls having end closures welded thereto and form annular receiving chambers for an indirect cooling fluid of the indirect cooling circuit for the generator-absorbers A, A', the construction and operation of which will be described in more detail hereinafter. In the cylindrical space formed by the inner cylindrical walls of the heat exchange vessels 18, 18' are electrical heating cartridges 20, 20' of any construction known to the art.

The upper end of each of the annular heat exchange chambers 18, 18' of the generator-absorbers A, A' is connected by conduits 34, 34' to the secondary condensers 36, 36'. Secondary condensers 36, 36' have a continuous downward slope throughout and lead to a reservoir 38. The reservoir 38 is connected by conduit 40 to a valve chamber 42. The valve chamber 42 is connected by conduits 44, 44' to the lower end of annular heat exchange vessels 18, 18' for the generator-absorbers A, A'. The valves 46, 46' are designed to be operated by a snap-acting device 45 of any suitable construction.

Each of the evaporators E, E' consists of two receiving vessels 16, 16' and 17, 17' having upwardly sloped looped conduits 47, 47' and 48, 48' connected thereto at their upper end and vertically extending legs 49, 49' and 50, 50' which extend downwardly from the receiving vessels 16, 16' and 17, 17' to the lower ends of the coiled conduits 47, 47' and 48, 48'. In actual practice, the downwardly extending conduits 49, 49', 50, 50' and the vessels 16, 16' and 17, 17' are embedded in insulation for a purpose to be described more fully hereinafter. The legs 49, 49' extend vertically downward from the bottom of the receiving vessels 16, 16' and the coiled portions of the conduits 47, 47' enter the receiving vessels 16, 16' at a point above the point of connection of the legs 49, 49'. The vertically extending legs 50, 50' extend vertically downward from the bottom of the receiving vessel 17, 17' while the coiled portions of the conduits 48, 48' enter the receiving vessels 17, 17' at a point above the point of connection of the legs 50, 50'. The conduits 14, 14' are connected to receiving vessels 16, 16' and 17, 17' by conduits 51, 51' and 52, 52' which branch off from the conduits 14, 14' and enter the top of the receiving vessels 16, 16' and 17, 17' to supply independent supplies of liquid refrigerant to the receiving vessels 16, 16' and 17, 17'. If desired the conduits 51, 51' may be connected to the conduits 14, 14' at a point lower than the conduits 52, 52' so that the receiving vessels 16, 16' will receive liquid refrigerant prior to the receiving vessels 17, 17' so that that portion of the evaporator will be certain to be supplied with liquid refrigerant.

As shown in Figure 2, the valve element 22 which cooperates with the opening of the conduit 52 into the vessel 17 is mounted on the interior of the storage vessels 17, 17' through the intermediary of a bimetallic thermostatic element 24 and bracket 26. The operation of this valve 22 will be described in more detail hereinafter.

As shown in Figure 1, the coiled conduits 47, 47' and 48, 48' are in thermal contact with walls forming chambers 54 and 55, respectively. The chambers 54 and 55 form the low and high temperature chambers, respectively, of a domestic refrigerator. The arrangements of the various parts of the apparatus with the refrigerator cabinet will be described in connection with the description of Figure 3.

The thermostatic bulbs 56, 56' contact the outer surfaces of the generator-absorbers A, A' and are connected by capillary tubes 58, 58' to bellows 60, 60', which upon expansion and contraction are adapted to operate the snap-acting device 45. The bulbs 56, 56', tubes 58, 58' and bellows 60, 60' contain a suitable vaporizable fluid so that the bellows 60, 60' will expand and contract upon variations in temperature of the bulbs 56, 56' as is well known in the art. A snap acting switch 62 of any well known construction is positioned to be actuated by the snap-acting device 45. A thermostatic bulb 96 is positioned in contact with the low temperature chamber 54 and is responsive to temperature of that chamber. The bulb 96 is connected by capillary tube 95 to a bellows 91 having one end rigidly connected to a control housing 81 as shown in Figure 4. A separate bulb 94 is positioned in contact with the chamber 55 and is responsive to the temperature of that chamber. The bulb 94 is connected by conduit 93 to a bellows 92 having one end rigidly attached to the control housing 81 as shown in Figure 4. The bulbs 96, 94, tubes 95, 93 and bellows 91, 92 contain a suitable vaporizable fluid so that the bellows 91 and 92 will expand and contract upon variations in temperature of the chambers 54 and 55 as is well known in the art.

Referring to Figure 4, the hontrol housing 81 carries the plunger 85 which extends through one wall thereof and is mounted to slide on a suitable guide 86 supported by the wall of the casing 81. The plunger 85 is urged to the left by means of a spring 87 which reacts between the guide 86 and a flange 88 formed on the left hand end of the plunger 85.

Fange 88 is arranged to be contacted by a pair of contact fingers 89 and 90 which are carried by the free ends of bellows 91 and 92, respectively.

The free end of the bellows 91 carries a projecting guide arm 97 which is slidably received in a smooth bore 98 of an adjusting nut 99. The element 99 may be secured against rotation by a projection on the housing 81, by making the plunger 97 and the bore 98 non-circular or in any other desired manner. The end of the nut element 99 remote from the bellows 91 is internally threaded to threadably receive adjusting screw 100 which projects through the walls of the chamber 81 and carries an adjusting knob 102.

A compression adjusting spring 104 surrounds the plunger 97 and bears at one end against the free end of the bellows 91 and at its opposite end against a suitable spring retaining cup 105 which bears against the adjusting nut 99. Consequently, rotation of the adjusting screw 100 will vary the compression of the spring 104 and will thereby vary the force against which the bellows 91 must expand to operate the plunger 85. Thus the temperature maintained in the chamber 54 will depend upon the compression of the spring 104 which will be determined by the adjustment setting of the knob 102.

The plunger 85 shown in Figure 4 is connected by a suitable lost motion connection to a snap-acting device 70 which upon reciprocation of the plunger 85 operates the valve 72 in the conduit 40 and an electric switch 74.

The indirect cooling circuit for the generator-absorbers A, A' which are formed by the heat exchange vessels 18, 18', conduits 34, 34', secondary condensers 36, 36', storage vessel 38, conduit 40, valve chamber 42 and conduits 44 and 44', is suitably charged with a vaporizable fluid such as methyl chloride. The pressure within the indirect cooling circuit is not high so that the snap-acting device 45 may be led into the interior of the valve chamber 42 through a suitable flexible joint 76.

The refrigerating apparatus shown diagrammatically in Figure 1 is adapted to be arranged so as to be mounted in a domestic refrigerator cabinet, as shown in Figure 3. The cabinet comprises a back insulated wall 80, lower insulated wall 82, front access doors 83 and 84, top insulated wall 76' and intermediate insulated wall 77. At the rear of the cabinet is provided a flue 78 for the circulation of air over the heat rejecting parts of the apparatus. An opening 79 at the bottom of the flue 78 provides for the entrance of cooling air and a screen 103 at its top is provided for its exit. The generator-absorbers A, A' are imbedded in insulation 104 and are arranged at the sides of the flue 78 so as not to interfere with the air circulation. The primary condensers C, C' extend across the flue 78 near its upper end slightly above the evaporators E, E' and the secondary condensers 36, 36' are similarly arranged below these primary condensers.

Preferably the walls forming the chambers 54 and 55 are secured to the coiled conduits 47, 47' and 48, 48', respectively, so as to be removable from the cabinet proper and the back insulated wall 80 is removable so that the entire unit can be assembled and disassembled from the cabinet as a unit. As an alternative construction, the coiled conduits 47, 47' and 48, 48' may be imbedded in the insulation forming the sides of the cabinet and bonded to the lining forming the inner walls of the chambers 54 and 55. In any event, as shown the collecting vessels 16, 16' and 17, 17' and the downwardly extending conduits 49, 49' and 50, 50' are imbedded in the insulated back wall 80.

As shown in Figure 1, the valve 72 is open and the switch 74 is closed. The switch 62 is set so that electricity will be conducted to the heating cartridge 20 of the generator-absorber A which will be heated. The bellows 60 is contracted and the bellows 60' is expanded by previous heating of the generator-absorber A', as will be described hereinafter. Thus the snap-acting device 45 will be positioned to the left, the valve 46 will be closed and the valve 46' open.

With the control set as in Figure 1, the heating of generator-absorber A will drive refrigerant vapor from the solid absorbent contained therein. The refrigerant vapor thus driven off will pass by conduit 10 to the condenser C where it will be condensed and the heat of condensation carried away by air flowing over the heat rejecting fins mounted upon the tubes of the condenser. The condenser C has a continuous downward slope throughout so that the condensed refrigerant will flow by gravity through the conduit 14 and conduits 51 and 52 into the receiving vessels 16 and 17 and into conduits 47, 48, 49 and 50. As will appear hereinafter the valve 22 in the chamber 17 will be open at this time.

During the heating of the generator-absorber A, the auxiliary cooling liquid in the annular heat exchange chamber 18 of the generator-absorber A will quickly vaporize, and flow by conduit 34 into the secondary condenser 36. The air flowing over the fins of the condenser 36 will carry away the heat of condensation of the auxiliary fluid whereby it will condense and flow downwardly through the tubes of the condenser 36 into the reservoir 38.

This liquid auxiliary cooling fluid cannot return to the generator-absorber at this time because the valve 46 is closed.

In the meantime absorption of refrigerant vapor takes place in the generator-absorber A' in a manner which will be described in connection with the absorption which takes place in the generator-absorber A when the control operates to shift the generator-absorber A from the generating phase to the absorption phase of operation and the generator-absorber A' from the absorption phase to the generating phase of operation.

When sufficient refrigerant has been driven from the absorbent in the generator-absorber A, the heat from the heating cartridge 20 will no longer be utilized in driving refrigerant vapor from the absorbent in the generator-absorber A and it will rise in temperature. This rise in temperature will be quite abrupt even though the heat applied to the generator-absorber A remains constant. This comes about by reason of the fact that while refrigerant is being driven from the solid absorbent, the heat supplied thereto is being utilized to vaporize the refrigerant and when the refrigerant is vaporized, the heat supplied quickly raises the temperature of the generator-absorber to a much higher value.

This will cause the liquid in the bulb 56 to vaporize whereby the bellows 60 will be expanded. At this time the bellows 60' will be in contracted position because absorption is taking place in the generator-absorber A' and the fluid in the bulb 56' will be condensed. Expansion of the bellows 60 will push the snap-acting device 45 to the right which will operate switch 62 to de-energize the heating element 20 and to energize the heating element 20'. At the same time it will operate to open the valve 46 and to close the valve 46'.

The indirect cooling system is charged with a sufficient auxiliary cooling medium so that the reservoir 38 will always contain auxiliary cooling medium in liquid form. When the control operates to open the valve 46, liquid in the reservoir 38 will be dumped into the annual heat exchange chamber 18 of the generator-absorber A. Since the generator-absorber A is hot at this time, the auxiliary cooling liquid will be quickly vaporized by the transfer of heat of vaporization to the auxiliary liquid from the generator-absorber A and it in turn will thus be quickly cooled. The cooling of the generator-absorber A will reduce the vapor pressure therein and the solid absorbent therein will begin to absorb refrigerant vapor and the vaporization of the liquid refrigerant in the evaporator E will begin.

At this time the coils 47 and 48 are in open communication with the receivers 16 and 17, respectively, and since the downwardly extending conduits 49 and 50 are imbedded in insulation as previously described and the coils 47 and 48 are in heat exchange relationship with the walls of the chambers 54 and 55, no refrigerant will be vaporized in the conduits 49 and 50 and considerable evaporation will take place in the coiled conduits 47 and 48 as the vapor pressure in the vessels 16 and 17 is reduced.

This will cause a rapid ebullition of refrigerant vapor in the upwardly extending coiled conduits 47 and 48, and consequently a positive circulation of liquid refrigerant will take place from the vessels 16 and 17, downwardly through the conduits 49 and 50 and upwardly through the conduits 47 and 48 and back to the vessels 16 and 17. This circulation takes place by the lifting action of the refrigerant vapor evaporated in the coiled conduits 47 and 48 and is known in the art as a vapor lift pump action. Thus the more refrigerant vapor that is evaporated in the conduits 47 and 48, the more rapid will be the circulation. Furthermore, the greater the refrigerant load that is placed on the chambers 54 and 55, the greater will be the amount of heat which will be transferred to the liquid refrigerant in the coiled conduits 47 and 48. This will produce a greater or lesser evaporation of refrigerant in the conduits 47 and 48, depending upon the refrigeration load placed on the chambers 54 and 55.

Thus it can be seen that the relative amount of refrigeration taking place in the coils 47 and 48 depends upon the relative load placed upon the chambers 54 and 55, respectively. During this period the temperatures in coiled conduits 47 and 48 will be substantially the same because the vapor pressures on their interior will be the same and each contains liquid refrigerant. Thus heat will be transferred from a relatively high temperature level to the ultimate cooling medium from both the chambers 54 and 55 during this period.

The above-described circulation of liquid refrigerant will continue in both conduits 47 and 48 until the temperature and consequently the vapor pressure in the vessels 16 and 17 falls below a predetermined limit. At this time the bimetallic thermostatic element 24 begins to move the valve 22 in an upward direction so as to throttle the flow of refrigerant vapor from the vessel 17 into the conduit 52, to reduce the rate of evaporation of refrigerant in the coiled conduit 48, and consequently reduce the rate of liquid circulation through the conduit 48 in heat exchange with the high temperature chamber 55. This will reduce the amount of heat transferred from the chamber 55 to the evaporating refrigerant.

When the temperature and consequently the vapor pressure of the refrigerant in the vessel 17 has been lowered to a further predetermined lower limit, the bimetallic thermostatic element 24 will have completely closed the valve 22 and no refrigerant vapor will flow from the vessel 17. At this time the circulation of liquid refrigerant from the vessel 17 through the conduits 50 and 48 and back to the vessel 17 will cease, since the vessel and the conduits are completely cut off from communication with the generator-absorber A and no further evaporation will take place in the conduit 48 to produce this circulation and no heat will be transferred from the high temperature chamber 55 to the evaporating refrigerant. This has a distinct advantage since all of the heat transferred from the high temperature chamber 55 to the ultimate cooling air is transferred from a high temperature zone rather than a low temperature zone as distinguished from the case where the vapor pressure in the vessel 17 is allowed to follow the lowering vapor pressure in the generator-absorber A to its ultimate end. This greatly increases the over-all thermal efficiency of the apparatus. The circulation of refrigerant and the production of refrigeration in the conduit 47, however, will continue until the control 56' operates to switch the generator-absorber A back to the generating period, as will be later described.

Since the production of refrigeration in the coil 48 has ceased, the temperature of the chamber 55 will slowly rise and any frost which may have frozen to the walls of the chamber 55 during the first part of the evaporation period will melt loose and the chamber 55 will be maintained in a moist cool condition.

As absorption proceeds in the generator-absorber A, the heat of absorption is transferred to the auxiliary cooling liquid in the annular heat exchange chamber 18. This vaporizes the auxiliary liquid and this vapor flows to the condenser 36 by conduit 34. The vapor is condensed and the heat of condensation is carried away by air flowing over the heat rejecting fins of the condenser 36. The tubes of the condenser 36 have a continuous downward slope and auxiliary cooling fluid returns to the reservoir 38 to return in due course to the annular heat exchange chamber 18 for further cooling action.

As evaporation and absorption are taking place in the evaporator E and the generator-absorber A, the generator-absorber A' is being heated by the heating element 20'. Vapor is being driven from the solid absorbent in the generator-absorber A', condensed in the condenser C' and collected in the evaporator E', as previously described in connection with the ebullition of vapor from the generator-absorber A.

By the time substantially all the liquid refrigerant in the evaporator E has evaporated, the refrigerant vapor will be driven from the solid absorbent in the generator-absorber A'. This will cause the medium in the bulb 56' to expand the bellows 60' in the manner previously described in connection with the generator-absorber A. Snap-acting device 45 will be moved to the left, as viewed in Figure 1, whereby the valve 46 will be closed, the valve 46' opened, and the switch 62 operated to energize the heating cartridge 20 and to de-energize the heating cartridge 20'. This will cause vaporization to take place in the generator-absorber A and absorption in the generator-absorber A', which will proceed as previously described.

The control bulbs 56, 56' function to operate alternately the generator-absorbers A, A' on the generating period and on the absorption period as just described, until the temperature of the chamber 54 goes below a predetermined limit, which may be very substantially below the temperature in the chamber 55. If at that time the chamber 55 is also at its lowermost proper temperature the bellows 92 will be collapsed. The lowering of the temperature in the chamber 54 will cause condensation of the fluid in the bulb 96 and contraction of the bellows 91, which will allow the spring 87 to force the plunger 85 backwardly so that it will close the valve 72 and open the switch 74. This will operate to de-energize the generator-absorber which is then being energized and stop the flow of cooling fluid in the indirect cooling circuit.

However, should a sudden load be placed on the high temperature compartment 55 or should that compartment not be at a desired low temperature, the bulb 94 will take over the control of the valve 72 and switch 74 and either operate the snap-acting device 70 to open the valve 72 and close the switch 74 or to hold the valve 72 in open position and the switch 74 in closed position so that the generator-absorber then on the generation period will be heated and the generator-absorber on the absorption period will receive cooling medium.

When the control 81 operates to shut off the energy to the unit being heated and the flow of auxiliary cooling medium to that being cooled, the liquid cooling medium in the heat exchange chamber of the generator-absorber which has been operating on the absorption cycle will soon vaporize due to the heat of absorption and will pass to the secondary condenser where it will be condensed. Since the tubes of the secondary condenser slope downwardly towards the reservoir 38, this condensed liquid refrigerant cannot return to the cooling space of the generator-absorber being cooled, but will flow to the reservoir 38 to be trapped out of circuit by the close valve 72. When the absorption of refrigerant vapor in the generator-absorber being cooled ceases, no more liquid refrigerant will evaporate in the evaporator of that unit. Thereafter, the temperature of the air in the chambers 54 and 55 will slowly rise until the control 81 again operates to open the valve 72 and close the switch 74. The two units will then operate cyclically as previously described.

When one of the units is operating on the generating period, the other is always operating on the evaporation and absorption period and substantially continuous refrigeration is being produced so that the chambers 54 and 55 are always maintained at the proper temperature.

From the foregoing it can be seen that this invention provides a method and apparatus by which a temperature differential can be maintained between high and low temperature chambers and in which the evaporator coils of each provide for circulation of liquid refrigerant therethrough at a rate proportional to the load on the respective chambers. The invention also provides means whereby heat transferred from the high and low temperature compartments to the refrigerant depends upon the load placed upon the respective chambers regardless of whether or not a large or small load is placed on either chamber.

The invention also provides a dual intermittent refrigerating machine having an indirect cooling circuit in which the heat input and the circulation of auxiliary cooling fluid is normally controlled by the temperature of the low temperature compartment but in case the high temperature compartment has an unusually high load thereon, the temperature of that compartment will take over the control of the supply of energy to the unit and also the circulation of auxiliary cooling medium.

The invention also provides for the cooling of two compartments and the maintaining of those compartments at different temperatures by an intermittent absorption refrigerating machine having an evaporator, a portion of which is in heat exchange relationship with each compartment in which the portion of the evaporator in heat exchange with the high temperature compartment is completely shut off from communication with the generator-absorber during the absorption period when the high temperature compartment reaches its desired temperature.

This feature of the invention is important since if a load should be placed on the high temperature compartment before the control bulbs 56, 56' operate to shift the generator-absorbers A, A' from the absorption period to the generating phase or vice versa, the vapor pressure in the portion of the evaporator in heat exchange relationship with the high temperature compartment will immediately rise and open the valve 22 to again establish communication between that portion of the evaporator and the generator-absorber whereby refrigeration will proceed in the portion of the evaporator in heat exchange relationship with the high temperature compartment as previously described until the temperature is again reduced to its proper value.

While I have shown but a single embodiment of my invention it is to be understood that this embodiment is to be taken as illustrative only and not in a limiting sense. I do not wish to be limited to the specific structure shown and described but to include all equivalent variations thereof except as limited by the scope of the claims.

I claim:

1. The method of producing different temperatures in two zones by means of an intermittent absorption refrigerating apparatus comprising, subjecting liquid refrigerant in both zones to the vapor pressure produced by the generator-absorber at the beginning of an absorption period of operation to evaporate liquid refrigerant in each zone at a high temperature, continuing the subjection of liquid refrigerant in each zone to the vapor pressure produced by the generator-absorber as the vapor pressure produced is lowered to evaporate liquid refrigerant in each zone at continuously decreasing temperatures and isolating the liquid refrigerant in the high temperature zone from the vapor pressure of the generator-absorber in response to a predetermined low temperature caused by the decreasing vapor pressure to discontinue evaporation of refrigerant in said high temperature zone while continuing the subjection of liquid refrigerant in the zone to be maintained at the lower temperature to the reducing vapor pressure produced by said generator-absorber to continue evaporation of liquid refrigerant in said zone at progressively lowered temperatures.

2. The method of producing different temperatures in two zones by means of an intermittent absorbent refrigerating apparatus comprising, subjecting liquid refrigerant in both zones to the vapor pressure produced by the generator-absorber at the beginning of an absorption period of operation to evaporate liquid refrigerant in each zone at a high temperature, continuing the subjection of liquid refrigerant in each zone to the vapor pressure produced by the generator-absorber as the vapor pressure is lowered to evaporate liquid refrigerant in each zone at continuously decreasing temperatures and discontinuing the subjection of liquid refrigerant in the high temperature zone to the vapor pressure of the generator-absorber in response to a predetermined low temperature caused by the decreasing vapor pressure to discontinue evaporation of refrigerant in said high temperature zone while continuing the subjection of liquid refrigerant in the zone to be maintained at the lower temperature to the reducing vapor pressure produced by the generator-absorber to continue evaporation of liquid refrigerant in the zone to be maintained at the lower temperature at progressively lowered temperatures and discontinuing the lowering of the vapor pressure in the generator-absorber in response to the temperature of the zone to be maintained at the lower temperature.

3. The method of producing different temperatures in two zones by means of an intermittent absorption refrigerating apparatus comprising, subjecting liquid refrigerant in both zones to the vapor pressure produced by the generator-absorber at the beginning of an absorption period of operation to evaporate liquid refrigerant in each zone at a high temperature, continuing the subjection of liquid refrigerant in each zone to the vapor pressure produced by the generator-absorber as the vapor pressure is produced to evaporate liquid refrigerant in each zone at continuously decreasing temperatures, isolating the liquid refrigerant in the high temperature zone from the vapor pressure of the generator-absorber in response to a predetermined low temperature caused by the decreasing vapor pressure to discontinue evaporation of liquid refrigerant in the high temperature zone while continuing the subjection of liquid refrigerant in the zone to be maintained at the lower temperature to the reducing vapor pressure produced by the generator-absorber to continue to evaporate liquid refrigerant in the zone to be maintained at the lower temperature at progressively lowered temperatures and again subjecting the zone to be maintained at a higher temperature to the lowered vapor pressure produced by the generator-absorber responsive to the temperature of that zone when there is a demand for refrigeration therein.

4. The method of producing different temperatures in two zones by means of an intermittent absorption refrigerating apparatus comprising, subjecting liquid refrigerant in both zones to the vapor pressure produced by the generator-absorber at the beginning of an absorption period of operation to evaporate liquid refrigerant in each zone at a high temperature and at a rate proportional to the load on each zone, continuing the subjection of liquid refrigerant in each zone to the vapor pressure produced by the generator-absorber as the vapor pressure is continuously reduced to evaporate liquid refrigerant in each zone at continuously decreasing temperatures and at a rate proportional to the load on each zone and isolating the liquid refrigerant in the zone to be maintained at the higher temperature responsive to a predetermined lowered temperature caused by the decreasing vapor pressure while continuing the subjection of liquid refrigerant in the zone to be maintained at the lower temperature to the reducing vapor pressure produced by the generator-absorber to continue evaporation of liquid refrigerant in the zone to be maintained at the lower temperature at a still lower temperature.

5. A method of producing different temperatures in two zones by means of an intermittent absorption refrigerating apparatus comprising, subjecting liquid refrigerant in both zones to the vapor pressure produced by the generator-absorber at the beginning of an absorption period of operation to evaporate liquid refrigerant in each zone at a high temperature while circulating liquid refrigerant through each zone at a rate proportional to their respective loads, continuing the subjection of liquid refrigerant in each zone to the vapor pressure produced by the generator-absorber as the vapor pressure is continuously reduced to evaporate liquid refrigerant in each zone at continuously decreasing temperatures while continuing to circulate liquid refrigerant through each zone at a rate proportional to their respective loads and isolating the liquid refrigerant in the zone to be maintained at the higher temperature from the vapor pressure produced by the generator-absorber and continuing the subjection of liquid refrigerant in the zone to be maintained at the lower temperature to the vapor pressure produced by the generator-absorber as the vapor pressure is continuously reduced to evaporate liquid refrigerant in the zone to be maintained at the lower temperature at a still lower temperature while continuing to circulate liquid refrigerant therethrough.

6. The method of producing different temperatures in two zones by means of two intermittent absorption refrigerating machines operating alternately on the evaporation-absorption and generation-condensation periods and each having an evaporator with portions in heat exchange with each zone comprising: subjecting liquid refrigerant in both portions of the evaporator of the one machine to the vapor pressure produced by the generator-absorber of that machine at the beginning of an absorption-evaporation period of operation of said machine to evaporate liquid refrigerant in each portion, continuing the subjection of said both portions to the vapor pressure produced by said generator-absorber as the vapor pressure is continuously reduced to evaporate liquid refrigerant in each of said portions at continuously lowered temperatures, discontinuing the subjection of liquid refrigerant in the portion of said evaporator in heat exchange with the zone to be maintained at the higher temperature to the vapor pressure produced by said generator-absorber while continuing to apply to the portion of said evaporator in heat exchange relation with the zone to be maintained at the lower temperature the vapor pressure produced in said generator-absorber to evaporate continuously liquid refrigerant therein at progressively lowered temperatures; while supplying liquid refrigerant to the evaporator of the machine operating on the generating-condensing period of operation and reversing the operation of said machines to subject portions of the evaporator of said second machine similarly to the vapor pressure produced in the generator-absorber of that machine and similarly to evaporate liquid refrigerant therein while liquid refrigerant is being supplied to the evaporator of the first machine.

7. Intermittent absorption refrigerating apparatus comprising, a generator-absorber, a condenser and an evaporator connected by conduits to form a closed system with the parts normally in open communication with each other, said evaporator comprising two independent portions each having a liquid reservoir connected in parallel to the conduit leading from the condenser, and means for cutting off communication between the liquid reservoir of one of said evaporator portions and said generator-absorber responsive to the temperature existing in said portion.

8. Intermittent absorption refrigerating apparatus comprising, a generator-absorber, a condenser and an evaporator connected by conduits to form a closed system with the parts normally in open communication with each other, said evaporator comprising two independent portions each having a liquid reservoir connected in parallel to the conduit leading from the condenser, and means for cutting off communication between the liquid reservoir of one of said evaporator portions and said generator-absorber responsive to the temperature existing in said portion, said one evaporator portion being in heat exchange relation with a high temperature compartment and the other portion being in heat exchange with a low temperature compartment.

9. The method of maintaining two spaces at different temperatures by means of an intermittent absorption refrigerating machine having an evaporator portion in heat exchange with each space comprising, the step of isolating the evaporator portion in heat exchange with the space to be maintained at the higher temperature and the generator-absorber when the machine is operating on the absorption-evaporation period responsive to the temperature in the evaporator portion in heat exchange with the space to be maintained at the higher temperaure.

10. An intermittent absorption refrigerating apparatus comprising, two intermittent absorption units operating alternately on the generation-condensation and absorption-evaporation periods of operation, each unit comprising a generator-absorber, a condenser and an evaporator connected by conduits to form a closed system with the parts normally in open communication with each other, each evaporator comprising a pair of portions connected in parallel to the condenser of its unit and having a portion of each evaporator in heat exchange with compartments to be maintained at different temperatures and means operable during the absorption-evaporation period of operation of each unit for cutting off communication between the portion in heat exchange with the compartment to be maintained at the higher temperature and the generator-absorber responsive to the temperature of the portion in heat exchange with the high temperature compartment.

11. An intermittent absorption refrigerating apparatus comprising, two intermittent absorption units operating alternately on the generation-condensation and absorption-evaporation periods of operation, each unit comprising a generator-absorber, a condenser and an evaporator connected by conduits to form a closed system with the parts normally in open communication with each other, each evaporator comprising a pair of portions connected in parallel to the condenser of its unit with a portion of each evaporator in heat exchange with compartments to be maintained at different temperatures and means operable during the absorption-evaporation period of operation of each unit for cutting off communication between the portion in heat exchange with the compartment to be maintained at the higher temperature and the generator-absorber responsive to the temperature of the portion in heat exchange with the high temperature compartment, and means for periodically and simultaneously shifting one unit from the absorption-evaporation to the generation-condensation period of operation and the other from the generation-condensation to the absorption-evaporation period of operation whereby both the high and low temperature compartments are maintained at the desired temperature independently of the temperature in the other.

12. An intermittent absorption refrigerating apparatus comprising, two intermittent absorption units operating alternately on the generation-condensation and absorption-evaporation periods of operation, each unit comprising a generator-absorber, a condenser and an evaporator connected by conduits to form a closed system with the parts normally in open communication with each other, each evaporator comprising a pair of portions connected in parallel to the condenser of its unit with the portion of each evaporator in heat exchange with spaces to be maintained at different temperatures, means operable during the absorption-evaporation period of operation of each unit for cutting off communication between the portion in heat exchange with the space to be maintained at higher temperature and the generator-absorber responsive to the temperature of the portion in heat exchange with the high temperature space, and means responsive to the temperature of the space to be maintained at the lower temperature for controlling the operation of said apparatus.

13. An intermittent absorption refrigerating apparatus comprising, a generator-absorber, a condenser and an evaporator connected by conduits to form a closed system with the parts normally in open communication with each other, said evaporator comprising two independent portions connected in parallel to the conduit leading from the condenser, means for cutting off communication between one of said evaporator portions and said generator-absorber responsive to the temperature produced in said portion, each of said evaporator portions comprising a downwardly extending looped coil having one leg insulated and the other in thermal contact with walls of a space to be cooled.

14. An intermittent absorption refrigerating apparatus comprising, a generator-absorber, a condenser and an evaporator connected by conduits to form a closed system with the parts normally in open communication with each other, said evaporator comprising two independent portions connected in parallel to the conduit leading from the condenser and means for cutting off communication between one of said evaporator portions and said generator-absorber responsive to the temperature produced in said portion, each of said evaporator portions comprising a downwardly extending looped coil having one leg insulated and the other in thermal contact with the walls of the space to be cooled, said looped coil being so constructed and arranged that the evaporation of liquid refrigerant therein causes a circulation of liquid refrigerant through said loop.

15. An intermittent absorption refrigerating apparatus comprising, two intermittent absorption units operating alternately on the generation-condensation and evaporation-absorption periods of operation, each unit comprising a generator-absorber, a condenser and an evaporator connected by conduits to form a closed system with the parts normally in open communication with each other, each evaporator comprising a pair of portions connected in parallel to the condenser of its unit with a portion of each evaporator in heat exchange with spaces to be maintained at different temperatures and means operable during the absorption-evaporation period of operation of each unit for shutting off communication between the portion in heat exchange with the space to be maintained in the higher temperature and the generator-absorber responsive to the temperature of the portion in heat exchange with the high temperature space, each of said portions having a looped coil extending downwardly therefrom having one leg insulated and the other in heat exchange with a space to be cooled.

16. An intermittent absorption refrigerating apparatus comprising, two intermittent absorption units operating alternately on the generation-condensation and absorption-evaporation periods of operation, each unit comprising a generator-absorber, a condenser and an evaporator connected by conduits to form a closed system with the parts normally in open communication with each other, each evaporator comprising a pair of portions connected in parallel to the condenser of its unit with a portion of each evaporator in heat exchange with compartments to be maintained at different temperatures and means operable during the absorption-evaporation period of operation of each unit for cutting off communication between the portion in heat exchange with the compartment to be maintained at the higher temperature and the generator-absorber responsive to the temperature of the portion in heat exchange with the high temperature compartment, each of said portions comprising a vessel with a looped coil extending downwardly therefrom having one leg insulated and the other in heat exchange with the compartment to be cooled, said looped coil being so constructed and arranged that the evaporation of liquid refrigerant therein causes a circulation of liquid refrigerant from the vessel, through the loop and back to the vessel.

17. An intermittent absorption refrigerating apparatus comprising, a generator-absorber, a condenser and an evaporator connected by conduits to form a closed system with the parts normally in open communication with each other, said evaporator comprising two independent portions connected in parallel to the conduit leading from the condenser and means for cutting off communication between one of said evaporator portions and said condenser responsive to the temperature produced in said portion, said means comprising a thermostatically operated valve operative both to open and close the refrigerant supply line leading to said one evaporator.

18. An intermittent absorption refrigerating apparatus comprising, two intermittent absorption units operating alternately on the generation-condensation and absorption-evaporation periods of operation, each unit comprising a generator-absorber, a condenser and an evaporator connected by conduits to form a closed system with the parts normally in open communication with each other, each evaporator comprising a pair of portions connected in parallel to the condenser of its unit with a portion of each evaporator in heat exchange with compartments to be maintained at different temperatures and means operable during the absorption-evaporation period of operation of each unit for cutting off communication between the portion in heat exchange with the compartment to be maintained at the higher temperature and the generator-absorber responsive to the temperature of the portion in heat exchange with the high temperature compartment, said means comprising a thermostatically operated valve for opening and closing the refrigerant supply line to the portion in heat exchange relationship with the compartment to be maintained at the higher temperature.

GEORGE P. DAIGER.

REFERENCES CITED

The following references are of record in the file of this patent:

UNITED STATES PATENTS

| Number | Name | Date |
|---|---|---|
| 462,904 | Miller | Nov. 10, 1891 |
| 1,222,642 | Loetscher | Apr. 17, 1917 |
| 1,703,351 | Molesworth et al. | Feb. 26, 1929 |
| 1,750,763 | Molesworth, et al. | Mar. 18, 1930 |
| 1,854,090 | Wright | Apr. 12, 1932 |
| 1,865,349 | Wright | June 28, 1932 |
| 2,316,792 | Irwin | Apr. 20, 1943 |